(12) United States Patent
Steiner

(10) Patent No.: US 8,879,184 B1
(45) Date of Patent: Nov. 4, 2014

(54) SERVO PATTERNS INCLUDING SELECTIVELY MAGNETIZABLE MAGNETIC FEATURES

(71) Applicant: Seagate Technology LLC, Cupertino, CA (US)

(72) Inventor: Philip Steiner, Los Altos, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/175,951

(22) Filed: Feb. 7, 2014

(51) Int. Cl.
*G11B 5/09* (2006.01)
*G11B 5/86* (2006.01)

(52) U.S. Cl.
USPC .............................................. 360/48; 360/17

(58) Field of Classification Search
USPC ............ 360/48, 17, 75, 51, 77.04, 77.08, 15, 360/135, 131, 133
See application file for complete search history.

(56) References Cited

U.S. PATENT DOCUMENTS

| | | | |
|---|---|---|---|
| 6,510,015 B2 | 1/2003 | Ellis et al. | |
| 7,164,548 B2 | 1/2007 | Hattori et al. | |
| 7,885,026 B2 | 2/2011 | Lee et al. | |
| 8,035,908 B2 * | 10/2011 | Park et al. | 360/17 |
| 8,154,813 B2 | 4/2012 | Weller et al. | |
| 2012/0044597 A1 | 2/2012 | Yoshida | |

* cited by examiner

*Primary Examiner* — Nabil Hindi

(57) ABSTRACT

Provided herein is an apparatus, including a servo pattern having magnetic features, wherein each magnetic feature of the magnetic features includes a single magnetic domain; a first population of the magnetic features; a second population of the magnetic features; and a selective magnetization means for selective magnetization of either one of the first population or the second population of magnetic features over the other.

20 Claims, 4 Drawing Sheets

US 8,879,184 B1

SERVO PATTERNS INCLUDING SELECTIVELY MAGNETIZABLE MAGNETIC FEATURES

BACKGROUND

A patterned recording medium for a digital data storage device such as a hard disk drive may include servo information for read-write head positioning in the hard disk drive. However, readback signals corresponding to the servo information may swing between a relatively high readback signal and a relatively low to zero readback signal rather than swinging between positive and negative readback signals of the same or about the same magnitude. A consequence of the foregoing may be reduced peak-to-peak amplitude in the servo sectors and DC baseline shifts when the read-write head moves from the servo sectors to data areas or data sectors and vice versa.

SUMMARY

Provided herein is an apparatus, including a servo pattern having magnetic features, wherein each magnetic feature of the magnetic features includes a single magnetic domain; a first population of the magnetic features; a second population of the magnetic features; and a selective magnetization means for selective magnetization of either one of the first population or the second population of magnetic features over the other.

These and other features and aspects of the concepts provided herein may be better understood with reference to the following drawings, description, and appended claims.

DRAWINGS

Figure 1:
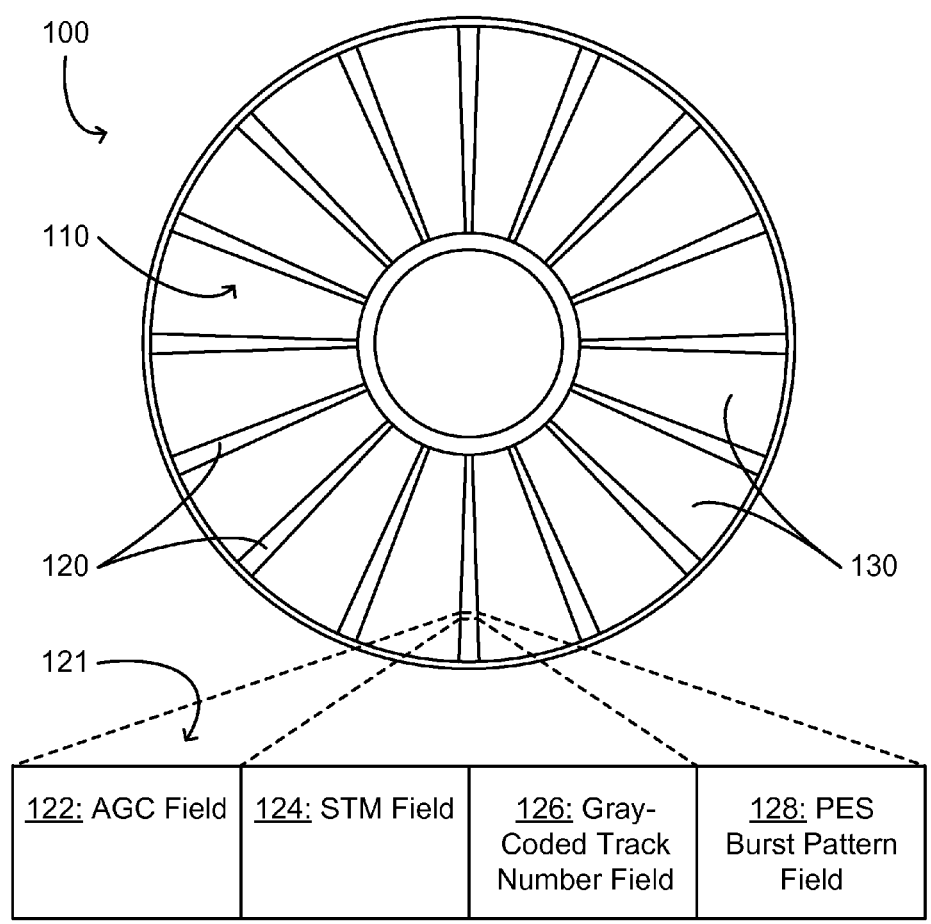

FIG. 1 provides a patterned recording medium according to one aspect of an embodiment.

Figure 2:
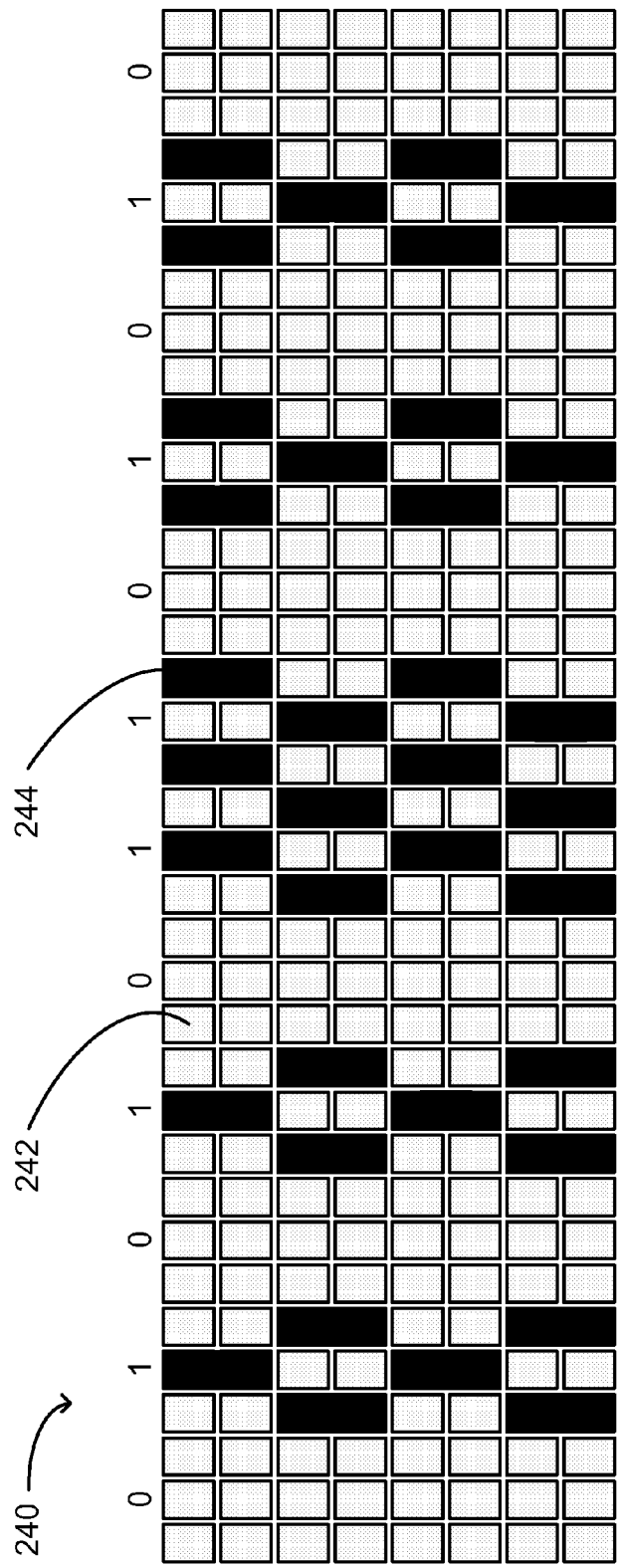

FIG. 2 provides a servo pattern according to one aspect of an embodiment.

Figure 3:
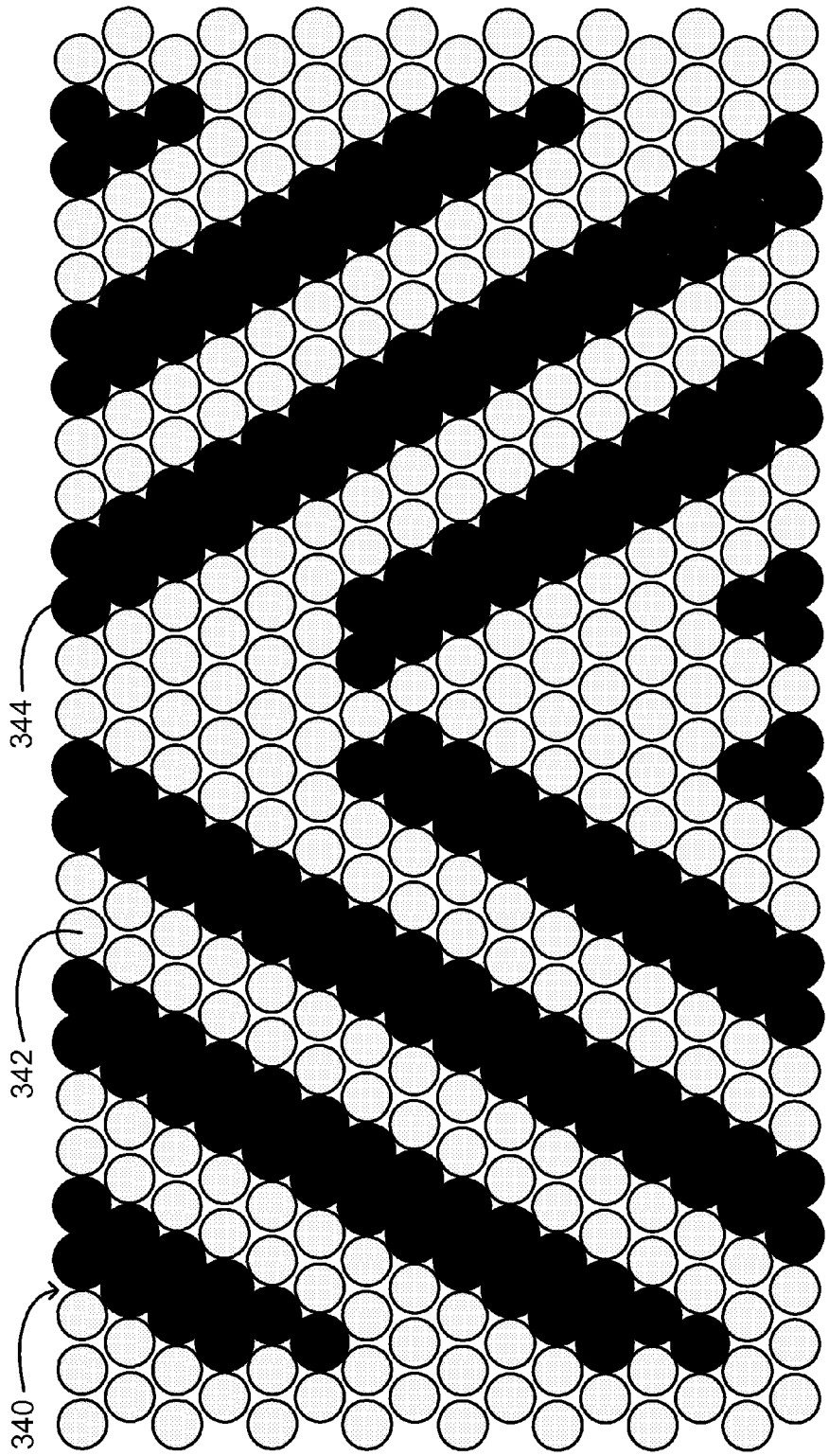

FIG. 3 provides a servo pattern according to one aspect of an embodiment.

Figure 4:
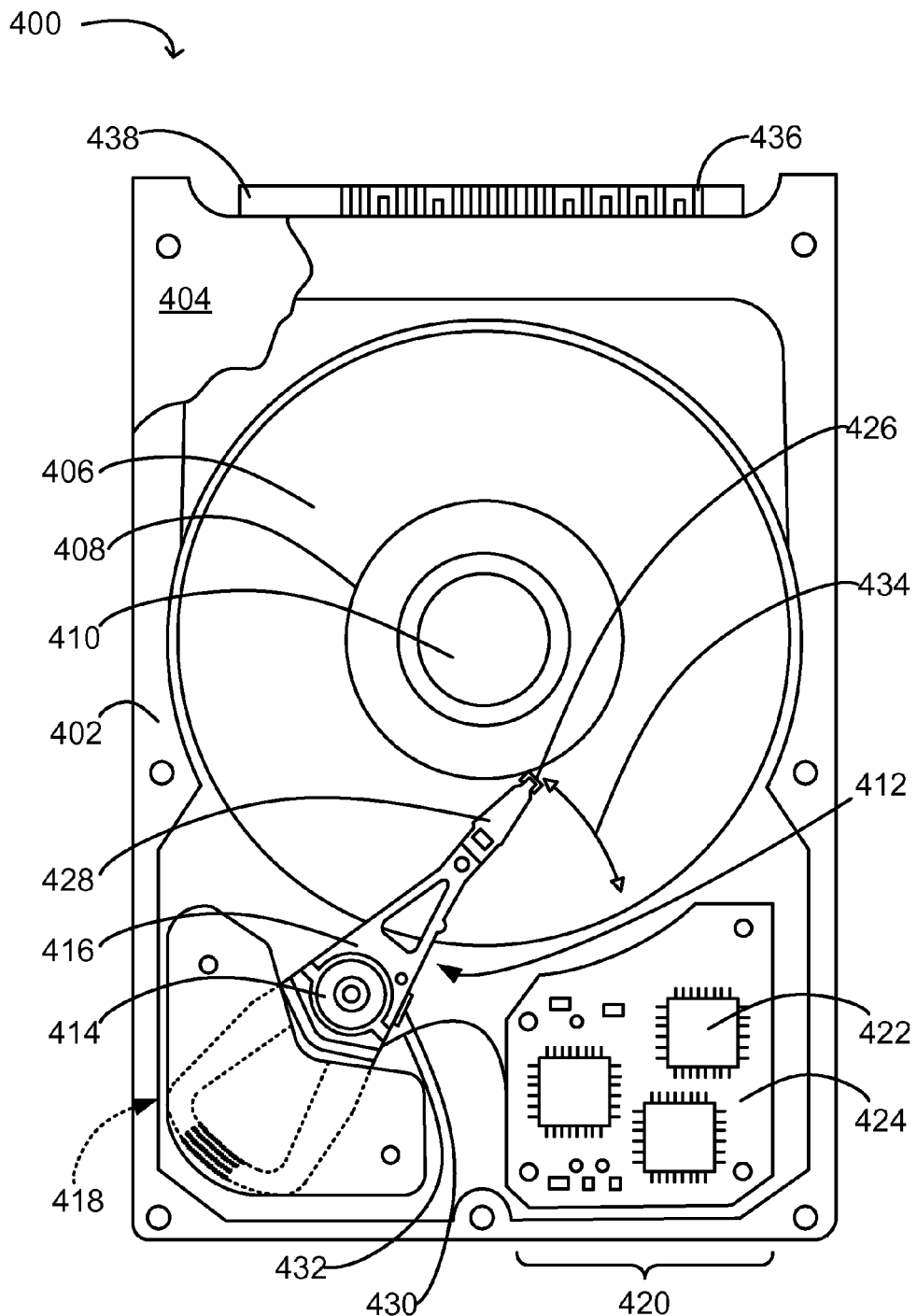

FIG. 4 provides a digital data storage device according to one aspect of an embodiment.

DESCRIPTION

Before some particular embodiments are described and/or illustrated in greater detail, it should be understood by persons having ordinary skill in the art that the particular embodiments provided herein do not limit the concepts provided herein, as elements in such particular embodiments may vary. It should likewise be understood that a particular embodiment provided herein has elements which may be readily separated from the particular embodiment and optionally combined with or substituted for elements in any of several other embodiments described and/or illustrated herein.

It should also be understood by persons having ordinary skill in the art that the terminology used herein is for the purpose of describing some particular embodiments, and the terminology does not limit the concepts provided herein. Unless indicated otherwise, ordinal numbers (e.g., first, second, third, etc.) are used to distinguish or identify different elements or steps in a group of elements or steps, and do not supply a serial or numerical limitation. For example, "first," "second," and "third" elements or steps need not necessarily appear in that order, and embodiments need not be necessarily limited to the three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art.

A patterned recording medium for a digital data storage device such as a hard disk drive may include servo information for read-write head positioning in the hard disk drive. To incorporate the servo information, magnetic material may be removed from certain magnetic regions, for example, servo areas or servo sectors, of the patterned recording medium to effect a servo pattern comprising remaining magnetic material and the areas in which the magnetic material was removed. The remaining magnetic material in the servo sectors may be subsequently magnetized by DC magnetization to effectively write the servo information, which DC magnetization orients the magnetic moments of the magnetic material in the same direction. After DC magnetization of the patterned recording medium, magnetic material remaining in the servo sectors of the patterned recording medium may have a relatively high readback signal compared to a relatively low to zero readback signal in the areas in which the magnetic material was removed. As such, readback signals corresponding to the servo information may swing between a relatively high readback signal and a relatively low to zero readback signal rather than swinging between positive and negative readback signals of the same or about the same magnitude. A consequence of the foregoing may be reduced peak-to-peak amplitude in the servo sectors and DC baseline shifts when the read-write head moves from the servo sectors to data areas or data sectors and vice versa. Furthermore, surface roughness may be inadvertently added to the patterned recording medium due to the magnetic material removed from the servo sectors.

Provided herein are apparatuses including patterned recording media including servo patterns patterned therein and methods related thereto. The servo patterns of the patterned recording media include at least a first population of magnetic features and a second population of magnetic features, wherein the magnetic features of the first population and the magnetic features of the second population have differential magnetic properties enabling one of the first population of magnetic features or the second population of magnetic features to be selectively magnetized over the other one. Being that one population of magnetic features may be selectively magnetized over another population of magnetic features, one population of magnetic features, for example, the first population of magnetic features, may be effectively magnetized such that the magnetic moments corresponding to the magnetic features of the first population may be oriented in a first direction. Likewise, another population of magnetic features, for example, the second population of magnetic features, may be effectively magnetized such that the magnetic moments corresponding to the magnetic features of the second population may be oriented in a second direction opposite the first direction. Due to resulting readback signals for the servo patterns swinging between positive readback signals (e.g., corresponding to the first population of magnetic features oriented in the first direction) and negative readback signals (e.g., corresponding to the second population of magnetic features oriented in the second direction) of the same or about the same magnitude, the readback signals may be increased in peak-to-peak amplitude, as compared to the servo pattern of the previously described patterned recording medium, minimizing or eliminating DC baseline shifts when the read-write head moves from servo sectors to data areas or data sectors and vice versa. Also, in contrast to the previously described patterned recording medium, the servo patterns do not contribute to an increase in surface roughness.

Patterned recording media including servo patterns patterned therein may include any recording media to which lithographic (e.g., microlithographic, nanolithographic, etc.) patterning may be applied or extended, including, but not limited to, longitudinal magnetic recording media ("LMR"), perpendicular magnetic recording media ("PMR"), heat-assisted magnetic recording media ("HAMR"), discrete track recording media ("DTR"), and bit-patterned media ("BPM"). In some embodiments, for example, the patterned recording media including servo patterns patterned therein may include BPM. FIG. 1 provides a non-limiting example of a patterned recording medium 100. It should be understood that the patterned recording medium 100 illustrated in FIG. 1 is a simplified illustration or schematic provided to aid understanding of the patterned recording media including servo patterns patterned therein. As such, the patterned recording medium 100 of FIG. 1 is illustrated without certain features such as tracks, zones for zoned bit recording, etc.

The servo patterns patterned into the patterned recording media may be part of any servo scheme for recording media, including, but not limited to, a wedge servo scheme, an embedded servo scheme, and a dedicated servo scheme. In some embodiments, for example, the servo patterns patterned into the patterned recording media may be part of an embedded servo scheme. FIG. 1 provides a non-limiting example of an embedded servo scheme 110 for the patterned recording medium 100. Because the patterned recording medium 100 illustrated in FIG. 1 is a simplified illustration or schematic without certain features such as zones for zoned bit recording, it should be understood that the embedded servo scheme 110 is not limited to the layout illustrated in FIG. 1. The embedded servo scheme 110, or any other scheme for servo encoding, including, but not limited to the foregoing, may have a layout in accordance with zone bit recording.

The servo patterns patterned into the patterned recording media may be part of any one or more servo areas or servo sectors in a servo scheme, including all servo sectors of a servo scheme. FIG. 1 provides a non-limiting example of the patterned recording medium 100 including the embedded servo scheme 110, which includes servo sectors 120 alternately arranged with data areas or data sectors 130. As further provided in FIG. 1, such servo sectors may include, but are not limited to, a cluster of servo sector fields 121. The cluster of servo sector fields may include, but is not limited to, one or more servo sector fields selected from an automatic gain control ("AGC") field 122, a servo timing mark ("STM") field 124, a Gray-coded track number field 126, and a position error signal ("PES") burst pattern field 128, the latter two of which servo sector fields (e.g., the Gray-coded track number field 126 and the PES burst pattern field) being related to generation of position feedback signals for positioning read-write heads. Because the patterned recording medium 100 illustrated in FIG. 1 is a simplified illustration or schematic without certain features such as tracks, it should be understood that the cluster of servo sector fields illustrated in FIG. 1 represents a cluster of servo sector fields in a single track traversing a single servo sector. The servo patterns patterned into the patterned recording media may be part or all of any one or more of the foregoing servo sector fields or their equivalents in any one or more tracks of any one or more servo sectors, including all of the foregoing servo sector fields or their equivalents in all tracks of all servo sectors.

The servo patterns of the patterned recording media include at least a first population of magnetic features and a second population of magnetic features, wherein one of the first population of magnetic features or the second population of magnetic features is the same or about the same as magnetic features present in one, more than one, or all data sectors, and wherein magnetic features of the first population and magnetic features of the second population have on or more differential magnetic properties enabling one of the first population of magnetic features or the second population of magnetic features to be selectively magnetized over the other one. The one or more differential magnetic properties enabling one population of magnetic features to be selectively magnetized over another population of magnetic features, includes, but is not limited to coercivity. In some embodiments, for example, the first population of magnetic features may have a first coercivity and the second population of magnetic features may have a second coercivity, wherein the first coercivity is greater than the second coercivity or the second coercivity is less than the first coercivity, for example, as measured in Oersteds ("Oe") or amperes per meters (Nm). In such embodiments, both the first population of magnetic features and the second population of magnetic features may be magnetized with an external magnetic field having a strength sufficient to orient the magnetic moments corresponding to the magnetic features of both the first population and the second population in a first direction (e.g., positive). Further in such embodiments, the second population of magnetic features may be magnetized with an external magnetic field having a strength insufficient to reorient the magnetic moments corresponding to the magnetic features of the first population in a second direction (e.g., negative) but sufficient to reorient the magnetic moments corresponding to the magnetic features of the second population in the second direction (e.g., negative), wherein the first direction (e.g., positive) and the second direction (e.g., negative) are opposite directions. In other embodiments, the servo pattern may be designed such that the magnetic moments corresponding to the magnetic features of the second population may reorient in the second direction (e.g., negative) using thermal energy. Further in such other embodiments, the magnetic moments corresponding to the magnetic features of the second population may spontaneously reorient under normal operating conditions (e.g., standard ambient temperature and pressure ["SATP"]) using ambiently available thermal energy or reorient using applied thermal energy. Without specific regard to the means, orientation of the magnetic moments corresponding to the magnetic features of the first population in a first direction (e.g., positive) and orientation of the magnetic moments corresponding to the magnetic features of the second population in a second direction (e.g., negative) may induce a lower energy state and/or more stable state for any one or more magnetic features of the first population or the second population; a lower energy state and/or more stable state for any one or more combinations of magnetic features of the first population and the second population; and/or a lower energy state and/or more stable state for any one or more servo patterns, which servo patterns may be part or all of any one or more servo sector fields or their equivalents in any one or more tracks of any one or more servo sectors, including all servo sector fields or their equivalents in all tracks of all servo sectors.

The differential magnetic property (e.g., coercivity) enabling one population of magnetic features to be selectively magnetized over another population of magnetic features, includes, but is not limited to, a differential magnetic property selected from a shape-based difference in coercivity, a size-based difference in coercivity, and a magnetic stack-based difference in coercivity. As such, magnetic features of one population may have a first coercivity and magnetic features of another population may have a second coercivity, wherein the first and second coercivities are different due to a difference in shape, size, magnetic stack, or some combination thereof between the magnetic features of the foregoing populations.

Magnetic features of a first population of magnetic features and magnetic features of a second population of magnetic features may have different shapes providing a shape-based difference in coercivity between the magnetic features of the first population and the magnetic features of the second population. Without being bound by theory, such a shape-based difference in coercivity is a result of shape anisotropy. Such a shape-based difference in coercivity enables one of the first population of magnetic features or the second population of magnetic features to be selectively magnetized over the other one. Any of a number of different shapes may be employed to effect the foregoing shape-based difference in coercivity including, but not limited to, shapes selected from polyhedrons, such as prisms, including right prisms, parallelepipeds, cuboids, and cubes; pillars or cylinders, such as right cylinders; spheres; and combinations thereof. The magnetic features of the first population and the magnetic features of the second population are not limited to the foregoing shapes, as the foregoing shapes may further include, for example, elongated forms (e.g., elongated parallelepipeds forming lines or a line-type features, for example, arranged as lamellae). Furthermore, it should be understood that the magnetic features of the first population and the magnetic features of the second population need not have markedly different shapes; the magnetic features of the first population and the magnetic features of the second population may be of the same general shape differing in one or more dimensions (e.g., length, width, etc.), which may also lead to certain size-based differences in coercivity as provided herein. For example, the magnetic features of the first population and the magnetic features of the second population may be cuboids differing in a length dimension as illustrated in FIG. 2.

FIG. 2 provides a top view of an example servo pattern 240 or a portion thereof (e.g., servo timing mark 124 or a portion thereof) in which a shape-based difference in coercivity enables one of the first population of magnetic features 242 or the second population of magnetic features 244 to be selectively magnetized over the other one. The magnetic features of the first population 242 are illustrated as grey rectangles, which represent magnetic features operable to be optimally written by a read-write head of a digital data storage device, and which may be the same or about the same as the magnetic features in the data sectors. The magnetic features of the second population 244 are illustrated as black rectangles, wherein the magnetic features of the second population 244 have twice the surface area (as shown) and/or volume of the magnetic features of the first population. Because the magnetic features of the second population 244 have twice the surface area (as shown) and/or volume of the magnetic features of the first population 242, the coercivity of the magnetic features of the second population 244 may be less than that for the magnetic features of the first population 242. The switching field for the magnetic features of the second population 244 may also be described as lower than that for the magnetic features of the first population 242.

In view of the foregoing example, both the first population of magnetic features 242 and the second population of magnetic features 244 may be magnetized with an external magnetic field having a strength sufficient to orient the magnetic moments corresponding to the magnetic features of both the first population 242 and the second population 244 in a first direction (e.g., positive). Further in view of the foregoing example, being that the second population of magnetic features 244 has a lower switching field than that of the first population of magnetic features 242, the second population of magnetic features 244 may be magnetized with an external magnetic field having a strength insufficient to reorient the magnetic moments corresponding to the magnetic features of the first population 242 in a second direction (e.g., negative) but sufficient to reorient the magnetic moments corresponding to the magnetic features of the second population 244 in the second direction (e.g., negative), wherein the first direction (e.g., positive) and the second direction (e.g., negative) are opposite directions. Alternatively, the servo pattern 240 may be designed such that the magnetic moments corresponding to the magnetic features of the second population 244 may spontaneously reorient in the second direction (e.g., negative) under normal operating conditions (e.g., SATP) using ambiently available thermal energy or reorient using applied thermal energy. The magnetic features of the second population 244, which are surrounded by the magnetic features of the first population 242, may have a lower energy state and/or more stable state due to their oppositely oriented magnetic moments, leading to an overall lower energy state and/or more stable state for the servo pattern 240, thereby stabilizing the servo pattern 240.

Alternatively or additionally to the foregoing shape-based differences in coercivity, magnetic features of a first population of magnetic features and magnetic features of a second population of magnetic features may have different sizes providing a size-based difference in coercivity between the magnetic features of the first population and the magnetic features of the second population. Such a size-based difference in coercivity enables one of the first population of magnetic features or the second population of magnetic features to be selectively magnetized over the other one. Any of a number of different sizes may be employed to effect the foregoing size-based difference in coercivity.

The magnetic features of a population of magnetic features may be millimeter-sized (e.g., admits of mm as measured), micrometer-sized (e.g., admits of μm as measured), or nanometer-sized (e.g., admits of nm as measured) in a minor dimension, contributing to the stability of the magnetic features, which magnetic features may each include a single magnetic domain. The single magnetic domain may be stable to reversal and/or to splitting into smaller magnetic domains, for example, under normal operating conditions (e.g., SATP) for any of the patterned recording media for digital data storage devices provided herein. In some embodiments, for example, the magnetic features of a population of magnetic features may be nanometer-sized, such as at least 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, or 20 nm in a minor dimension. In some embodiments, for example, the magnetic features of a population of magnetic features may be nanometer-sized, such as no more 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm, or 1 nm in a minor dimension. Combinations of the foregoing may also be used to describe the size of magnetic features in a population of magnetic features. In some embodiments, for example, the magnetic features in a population of magnetic features may be at least 1 nm and no more than 20 nm (e.g., inclusively between 1 nm and 20 nm) in a minor dimension, such as at least 5 nm and no more than 15 nm (e.g., inclusively between 5 nm and 15 nm) in a minor dimension, including at least 8 nm and no more than 12 nm (e.g., inclusively between 8 nm and 11 nm) in a minor dimension, for example, at least 9 nm and no more than 10 nm (e.g., inclusively between 9 nm and 10 nm) in a minor dimension. The foregoing is not intended to be limiting as the magnetic features of a population of magnetic features be sized as appropriate for any of the patterned recording media for digital data storage devices provided herein.

FIG. 3 provides a top view of an example servo pattern 340 or a portion thereof (e.g., PES burst pattern field 128 or a portion thereof) in which a size-based difference in coercivity enables one of the first population of magnetic features 342 or the second population of magnetic features 344 to be selectively magnetized over the other one. The magnetic features of the first population 342 are illustrated as grey circles, which represent magnetic features operable to be optimally written by a read-write head of a digital data storage device, and which may be the same or about the same as the magnetic features in the data sectors. The magnetic features of the second population 344 are illustrated as black circles, wherein some of the magnetic features of the second population 344 merge into continuous regions due to their larger size and certain characteristics or limits of lithography (e.g., nanolithography). Because the magnetic features of the second population 344 are larger in size and/or form continuous regions having shape-based differences in coercivity as provided herein, the coercivity of the magnetic features of the second population 344 may be less than that for the magnetic features of the first population 342. The switching field for the magnetic features of the second population 344 may also be described as lower than that for the magnetic features of the first population 342.

In view of the foregoing example, both the first population of magnetic features 342 and the second population of magnetic features 344 may be magnetized with an external magnetic field having a strength sufficient to orient the magnetic moments corresponding to the magnetic features of both the first population 342 and the second population 344 in a first direction (e.g., positive). Further in view of the foregoing example, being that the second population of magnetic features 344 has a lower switching field than that of the first population of magnetic features 342, the second population of magnetic features 344 may be magnetized with an external magnetic field having a strength insufficient to reorient the magnetic moments corresponding to the magnetic features of the first population 342 in a second direction (e.g., negative) but sufficient to reorient the magnetic moments corresponding to the magnetic features of the second population 344 in the second direction (e.g., negative), wherein the first direction (e.g., positive) and the second direction (e.g., negative) are opposite directions. Alternatively, the servo pattern 340 may be designed such that the magnetic moments corresponding to the magnetic features of the second population 344 may spontaneously reorient in the second direction (e.g., negative) under normal operating conditions (e.g., SATP) using ambiently available thermal energy or reorient using applied thermal energy. The magnetic features of the second population 344, which are surrounded by the magnetic features of the first population 342, may have a lower energy state and/or more stable state due to their oppositely oriented magnetic moments, leading to an overall lower energy state and/or more stable state for the servo pattern 340, thereby stabilizing the servo pattern 340.

Alternatively or additionally to the foregoing shape-based and/or size-based differences in coercivity, magnetic features of a first population of magnetic features and magnetic features of a second population of magnetic features may have different magnetic stacks providing a magnetic stack-based difference in coercivity between the magnetic features of the first population and the magnetic features of the second population. Such a magnetic stack-based difference in coercivity enables one of the first population of magnetic features or the second population of magnetic features to be selectively magnetized over the other one. Any of a number of different magnetic stacks may be employed to effect the foregoing magnetic stack-based difference in coercivity.

One of the first population of magnetic features or the second population of magnetic features may have the same or about the same magnetic stack as the magnetic features in the data sectors, including, but not limited to, an underlayer structure, a seed layer, a recording layer, and a protective overcoat. The other one of the first population of magnetic features or the second population of magnetic features may have a different magnetic stack when compared to the magnetic features in the data sectors, the different magnetic stack including a presence of one or more additional layers in the magnetic stack, an absence of one or more layers from the magnetic stack, a difference in one or more layers of the second magnetic stack, or a combination thereof.

In some embodiments, for example, the magnetic stack of the magnetic features in the data sectors includes a recording layer having a magnetically soft material overlying a magnetically hard material, and the different magnetic stack of the first population of magnetic features or the second population of magnetic features does not include the magnetically soft material overlying the magnetically hard material of the recording layer. Because the magnetically soft material lowers the switching field of the magnetic features, removing the magnetically soft material overlying the magnetically hard material from the recording layer of the first population of magnetic features or the second population of magnetic features increases the switching field of the magnetic features from which the magnetically soft material was removed.

In some embodiments, for example, the magnetic stack of the magnetic features in the data sectors includes a seed layer, and the different magnetic stack of the first population of magnetic features or the second population of magnetic features includes a different seed layer. The different seed layer may be such that magnetic material is encouraged to grow only in certain areas, in certain shapes, with certain crystallographic properties, and/or in certain sizes.

In some embodiments, for example, the magnetic stack of the magnetic features in the data sectors includes an exchange break layer, and the different magnetic stack of the first population of magnetic features or the second population of magnetic features includes a different exchange break layer.

In some embodiments, for example, the magnetic stack of the first population of magnetic features or the second population of magnetic features includes one or more layers treated by ion implantation making the one or more layers of the magnetic stack of the first population of magnetic features or the second population of magnetic features different than the magnetic stack of the magnetic features in the data sectors.

In consideration of the magnetic features of the second population of magnetic features having a lower switching field than the magnetic features of the first population of magnetic features due to a difference in magnetic stacks, both the first population of magnetic features and the second population of magnetic features may be magnetized with an external magnetic field having a strength sufficient to orient the magnetic moments corresponding to the magnetic features of both the first population and the second population in a first direction (e.g., positive). Being that the second population of magnetic features has a lower switching field than that of the first population of magnetic features, the second population of magnetic features may be magnetized with an external magnetic field having a strength insufficient to reorient the magnetic moments corresponding to the magnetic features of the first population in a second direction (e.g., negative) but sufficient to reorient the magnetic moments corresponding to the magnetic features of the second population in the second direction (e.g., negative), wherein the first direction (e.g., positive) and the second direction (e.g., negative) are opposite directions. Alternatively, the servo pattern may be designed such that the magnetic moments corresponding to the magnetic features of the second population may spontaneously reorient in the second direction (e.g., negative) under normal operating conditions (e.g., SATP) using ambiently available thermal energy or reorient using applied thermal energy. The magnetic features of the second population, which may be surrounded by the magnetic features of the first population, may have a lower energy state and/or more stable state due to their oppositely oriented magnetic moments, leading to an overall lower energy state and/or more stable state for the servo pattern, thereby stabilizing the servo pattern.

FIG. 4 is a plan view of a non-limiting example of a digital data storage device in which or like which the patterned recording media described herein may be used. A disk drive 400 generally may include a base plate 402 and a cover 404 that may be disposed on the base plate 402 to define an enclosed housing for various disk drive components. The disk drive 400 may include one or more data storage disks 406 of computer-readable data storage media such as patterned recording media. Both of the major surfaces of each data storage disk 406 may include a plurality of concentrically disposed tracks for data storage purposes. Each data storage disk 406 may be mounted on a hub 408, which in turn may be rotatably interconnected with the base plate 402 and/or the cover 404. Multiple data storage disks 406 may be mounted in vertically spaced and parallel relation on the hub 408. A spindle motor 410 may rotate the data storage disks 406.

The disk drive 400 may also include an actuator arm assembly 412 that pivots about a pivot bearing 414, which in turn may be rotatably supported by the base plate 402 and/or the cover 404. The actuator arm assembly 412 may include one or more individual rigid actuator arms 416 that extend out from near the pivot bearing 414. Multiple actuator arms 416 may be disposed in vertically spaced relation, with one actuator arm 416 being provided for each major data storage surface of each data storage disk 406 of the disk drive 400. Other types of actuator arm assembly configurations could be utilized as well, an example being an "E" block having one or more rigid actuator arm tips, or the like, that cantilever from a common structure. Movement of the actuator arm assembly 412 may be provided by an actuator arm drive assembly, such as a voice coil motor 418 or the like. The voice coil motor 418 may be a magnetic assembly that controls the operation of the actuator arm assembly 412 under the direction of control electronics 420.

The control electronics 420 may include a plurality of integrated circuits 422 coupled to a printed circuit board 424. The control electronics 420 may be coupled to the voice coil motor assembly 418, a slider 426, or the spindle motor 410 using interconnects that can include pins, cables, or wires (not shown).

A load beam or suspension 428 may be attached to the free end of each actuator arm 416 and cantilevers therefrom. The suspension 428 may be biased generally toward its corresponding data storage disk 406 by a spring-like force. The slider 426 may be disposed at or near the free end of each suspension 428. What is commonly referred to as the read/write head (e.g., transducer) may be appropriately mounted as a head unit (not shown) under the slider 426 and is used in disk drive read/write operations. The head unit under the slider 426 may utilize any of various types of read sensor technologies, including, but not limited to, anisotropic magnetoresistive (AMR), giant magnetoresistive (GMR), tunneling magnetoresistive (TuMR), other magnetoresistive technologies, and other suitable technologies.

The head unit under the slider 426 may be connected to a preamplifier 430, which may be interconnected with the control electronics 420 of the disk drive 400 by a flex cable 432 mounted on the actuator arm assembly 412. Signals are exchanged between the head unit and its corresponding data storage disk 406 for disk drive read/write operations. In this regard, the voice coil motor 418 may be utilized to pivot the actuator arm assembly 412 to simultaneously move the slider 426 along a path 434 and across the corresponding data storage disk 406 to position the head unit at the appropriate position on the data storage disk 406 for disk drive read/write operations.

In accordance with some disk drive designs, when the disk drive 400 is not in operation, the actuator arm assembly 412 may be pivoted to a "parked position" to dispose each slider 426 generally at or beyond a perimeter of its corresponding data storage disk 406, but in any case in vertically spaced relation to its corresponding data storage disk 406. In such designs, the disk drive 400 may include a ramp assembly (not shown) that is disposed beyond a perimeter of the data storage disk 406 to both move the corresponding slider 426 vertically away from its corresponding data storage disk 406 and to also exert somewhat of a retaining force on the actuator arm assembly 412.

Exposed contacts 436 of a drive connector 438 along a side end of the disk drive 400 may be used to provide connectivity between circuitry of the disk drive 400 and a next level of integration such as an interposer, a circuit board, a cable connector, or an electronic assembly. The drive connector 438 may include jumpers (not shown) or switches (not shown) that may be used to configure the disk drive 400 for user specific features or configurations. The jumpers or switches may be recessed and exposed from within the drive connector 438.

As such, provided herein is an apparatus, comprising a servo pattern comprising magnetic features, wherein each magnetic feature of the magnetic features comprises a single magnetic domain; a first population of the magnetic features having a first coercivity; and a second population of the magnetic features having a second coercivity different than the first coercivity, and wherein the magnetic features of the first population and the second population have oppositely oriented magnetizations. In some embodiments, the magnetic features of the first population and the second population interact to stabilize the servo pattern. In some embodiments, the first coercivity is a characteristic of the magnetic features of the first population having a first shape, and wherein the second coercivity is a characteristic of the magnetic features of the second population having a second shape different than the first shape. In some embodiments, the first coercivity is a characteristic of the magnetic features of the first population having a first size, and wherein the second coercivity is a characteristic of the magnetic features of the second population having a second size different than the first size. In some embodiments, the first coercivity is a characteristic of the magnetic features of the first population having a first magnetic stack, and wherein the second coercivity is a characteristic of the magnetic features of the second population having a second magnetic stack different than the first magnetic stack. In some embodiments, the second magnetic stack is comparatively different than the first magnetic stack due to a presence of one or more additional layers in the second magnetic stack, an absence of one or more layers from the second magnetic stack, a difference in one or more layers of the second magnetic stack, or a combination thereof. In some embodiments, the absence of one or more layers of the second magnetic stack comprises the absence of a magnetically soft material overlying a magnetically hard material in the second magnetic stack. In some embodiments, the difference in one or more layers of the second magnetic stack comprises a reduction in an amount of a magnetically soft material overlying a magnetically hard material or ion implantation in the one or more layers of the second magnetic stack. In some embodiments, the first magnetic stack comprises a first seed layer and the second magnetic stack comprises a second seed layer different than the first seed layer. In some embodiments, the first magnetic stack comprises a first exchange break layer and the second magnetic stack comprises a second exchange break layer different than the first exchange break layer.

Also provided herein is an apparatus, comprising a servo pattern comprising magnetic features, wherein each magnetic feature of the magnetic features comprises a single magnetic domain; a first population of the magnetic features; a second population of the magnetic features; and a selective magnetization means for selective magnetization of either one of the first population or the second population of magnetic features over the other. In some embodiments, the selective magnetization means comprises a shape-based difference between the magnetic features of the first population and the second population contributing to a difference in coercivity between the magnetic features of the first population and the second population. In some embodiments, the selective magnetization means comprises a size-based difference between the magnetic features of the first population and the second population contributing to a difference in coercivity between the magnetic features of the first population and the second population. In some embodiments, the selective magnetization means comprises a magnetic stack-based difference between the magnetic features of the first population and the second population contributing to a difference in coercivity between the magnetic features of the first population and the second population. In some embodiments, the magnetic features of the first population and the second population interact to stabilize the servo pattern.

Also provided herein is a method, comprising lithographically patterning a first population and a second population of magnetic features into a servo pattern for a magnetic recording medium, wherein each magnetic feature of the first population and the second population of magnetic features comprises a single magnetic domain; and selectively magnetizing the first population and the second population of magnetic features to have oppositely oriented magnetizations. In some embodiments, lithographically patterning further comprises creating a shape-based difference between the magnetic features of the first population and the second population contributing to a difference in coercivity for the selective magnetizing. In some embodiments, lithographically patterning further comprises creating a size-based difference between the magnetic features of the first population and the second population contributing to a difference in coercivity for the selective magnetizing. In some embodiments, lithographically patterning further comprises creating a magnetic stack-based difference between the magnetic features of the first population and the second population contributing to a difference in coercivity for the selective magnetizing. In some embodiments, lithographically patterning further comprises stabilizing the servo pattern through interaction of the first population and the second population of magnetic features.

While some particular embodiments have been described and/or illustrated herein, and while these particular embodiments have been described and/or illustrated in considerable detail, it is not the intention of the applicant(s) for these particular embodiments to limit the scope of the concepts presented herein. Additional adaptations and/or modifications may readily appear to persons having ordinary skill in the art, and, in broader aspects, these adaptations and/or modifications may be encompassed as well. Accordingly, departures may be made from the foregoing embodiments without departing from the scope of the concepts provided herein. The implementations provided herein and other implementations are within the scope of the following claims.

What is claimed is:

1. An apparatus, comprising:
    a servo pattern comprising magnetic features,
        wherein each magnetic feature of the magnetic features comprises a single magnetic domain;
    a first population of the magnetic features having a first coercivity; and
    a second population of the magnetic features having a second coercivity different than the first coercivity, and wherein the magnetic features of the first population and the second population have oppositely oriented magnetizations.

2. The apparatus of claim 1, wherein the magnetic features of the first population and the second population interact to stabilize the servo pattern.

3. The apparatus of claim 1, wherein the first coercivity is a characteristic of the magnetic features of the first population having a first shape, and wherein the second coercivity is a characteristic of the magnetic features of the second population having a second shape different than the first shape.

4. The apparatus of claim 1, wherein the first coercivity is a characteristic of the magnetic features of the first population having a first size, and wherein the second coercivity is a characteristic of the magnetic features of the second population having a second size different than the first size.

5. The apparatus of claim 1, wherein the first coercivity is a characteristic of the magnetic features of the first population having a first magnetic stack, and wherein the second coercivity is a characteristic of the magnetic features of the second population having a second magnetic stack different than the first magnetic stack.

6. The apparatus of claim 5, wherein the second magnetic stack is comparatively different than the first magnetic stack due to a presence of one or more additional layers in the second magnetic stack, an absence of one or more layers from the second magnetic stack, a difference in one or more layers of the second magnetic stack, or a combination thereof.

7. The apparatus of claim 6, wherein the absence of one or more layers of the second magnetic stack comprises the absence of a magnetically soft material overlying a magnetically hard material in the second magnetic stack.

8. The apparatus of claim 6, wherein the difference in one or more layers of the second magnetic stack comprises a reduction in an amount of a magnetically soft material overlying a magnetically hard material or ion implantation in the one or more layers of the second magnetic stack.

9. The apparatus of claim 5, wherein the first magnetic stack comprises a first seed layer and the second magnetic stack comprises a second seed layer different than the first seed layer.

10. The apparatus of claim 5, wherein the first magnetic stack comprises a first exchange break layer and the second magnetic stack comprises a second exchange break layer different than the first exchange break layer.

11. An apparatus, comprising:
a servo pattern comprising magnetic features,
wherein each magnetic feature of the magnetic features comprises a single magnetic domain;
a first population of the magnetic features;
a second population of the magnetic features; and
a selective magnetization means for selective magnetization of either one of the first population or the second population of magnetic features over the other.

12. The apparatus of claim 11, wherein the selective magnetization means comprises a shape-based difference between the magnetic features of the first population and the second population contributing to a difference in coercivity between the magnetic features of the first population and the second population.

13. The apparatus of claim 11, wherein the selective magnetization means comprises a size-based difference between the magnetic features of the first population and the second population contributing to a difference in coercivity between the magnetic features of the first population and the second population.

14. The apparatus of claim 11, wherein the selective magnetization means comprises a magnetic stack-based difference between the magnetic features of the first population and the second population contributing to a difference in coercivity between the magnetic features of the first population and the second population.

15. The apparatus of claim 11, wherein the magnetic features of the first population and the second population interact to stabilize the servo pattern.

16. A method, comprising:
lithographically patterning a first population and a second population of magnetic features into a servo pattern for a magnetic recording medium,
wherein each magnetic feature of the first population and the second population of magnetic features comprises a single magnetic domain; and
selectively magnetizing the first population and the second population of magnetic features to have oppositely oriented magnetizations.

17. The method of claim 16, wherein lithographically patterning further comprises creating a shape-based difference between the magnetic features of the first population and the second population contributing to a difference in coercivity for the selective magnetizing.

18. The method of claim 16, wherein lithographically patterning further comprises creating a size-based difference between the magnetic features of the first population and the second population contributing to a difference in coercivity for the selective magnetizing.

19. The method of claim 16, wherein lithographically patterning further comprises creating a magnetic stack-based difference between the magnetic features of the first population and the second population contributing to a difference in coercivity for the selective magnetizing.

20. The method of claim 16, wherein lithographically patterning further comprises stabilizing the servo pattern through interaction of the first population and the second population of magnetic features.

* * * * *